US010009598B2

(12) United States Patent
Pacheco et al.

(10) Patent No.: US 10,009,598 B2
(45) Date of Patent: Jun. 26, 2018

(54) DYNAMIC MODE SWITCHING OF 2D/3D MULTI-MODAL CAMERA FOR EFFICIENT GESTURE DETECTION

(71) Applicant: Dell Products L.P., Round Rock, TX (US)

(72) Inventors: Roman J. Pacheco, Leander, TX (US); Keith M. Alfano, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 405 days.

(21) Appl. No.: 14/701,717

(22) Filed: May 1, 2015

(65) Prior Publication Data

US 2016/0323564 A1  Nov. 3, 2016

(51) Int. Cl.
*H04N 13/02* (2006.01)
*G06K 9/00* (2006.01)
*G06F 3/01* (2006.01)
*G06F 3/03* (2006.01)
*H04N 5/44* (2011.01)
*H04N 5/63* (2006.01)
*H04N 5/14* (2006.01)

(52) U.S. Cl.
CPC ......... *H04N 13/0289* (2013.01); *G06F 3/017* (2013.01); *G06F 3/0304* (2013.01); *G06K 9/00335* (2013.01); *G06K 9/00389* (2013.01); *H04N 5/4401* (2013.01); *H04N 5/63* (2013.01); *H04N 5/144* (2013.01); *H04N 2005/4428* (2013.01)

(58) Field of Classification Search
CPC ............ H04N 13/0289; H04N 13/0468; G06F 3/017; G06K 9/00355; G06K 9/00389
USPC ......................................................... 348/158
See application file for complete search history.

(56) References Cited

U.S. PATENT DOCUMENTS

| | | | | |
|---|---|---|---|---|
| 7,308,112 B2* | 12/2007 | Fujimura | ........... | G06K 9/00355 382/103 |
| 8,897,490 B2* | 11/2014 | Zhang | ..................... | G06F 3/017 345/156 |
| 9,223,404 B1* | 12/2015 | Ivanchenko | .............. | G06T 7/11 |
| 9,336,440 B2* | 5/2016 | Ramachandran | .. | G06K 9/00624 |
| 2011/0134251 A1* | 6/2011 | Kim | ........................ | H04N 5/232 348/164 |
| 2012/0068917 A1* | 3/2012 | Huang | .................... | G06F 3/017 345/156 |
| 2013/0004016 A1* | 1/2013 | Karakotsios | ....... | G06K 9/00355 382/103 |

(Continued)

OTHER PUBLICATIONS

Pointgrab, http://www.pointgrab.com/274/consumer-electronics/, printed Feb. 22, 2016.

(Continued)

*Primary Examiner* — David Harvey
(74) *Attorney, Agent, or Firm* — Terrile, Cannatti, Chambers & Holland, LLP; Stephen A Terrile (57) ABSTRACT

A system, method, and computer-readable medium are disclosed for dynamically controlling a multi-modal camera system to take advantage of the benefits of sensing gestures with a 2D camera, while overcoming the challenges associated with 2D cameras for performing gesture detection. In certain embodiments, the multi-modal camera system includes an RGB camera and a depth camera, thus providing both a 2D and a 3D capture mode.

12 Claims, 4 Drawing Sheets

(56) References Cited

U.S. PATENT DOCUMENTS

| | | | | |
|---|---|---|---|---|
| 2013/0162514 A1* | 6/2013 | Zawacki | ............... | G06F 1/3206 |
| | | | | 345/156 |
| 2013/0229491 A1* | 9/2013 | Kim | ........................ | G06F 3/017 |
| | | | | 348/46 |
| 2014/0118257 A1* | 5/2014 | Baldwin | ................. | G06F 3/017 |
| | | | | 345/158 |
| 2014/0169621 A1* | 6/2014 | Burr | ................... | G06K 9/00335 |
| | | | | 382/103 |
| 2015/0029092 A1* | 1/2015 | Holz | ........................ | G06F 3/017 |
| | | | | 345/156 |
| 2016/0343148 A1* | 11/2016 | Nguyen | ............... | G06K 9/6267 |
| 2016/0353080 A1* | 12/2016 | Nguyen | ............. | H04N 13/0044 |

OTHER PUBLICATIONS

Eyesight, http://eyesight-tech.com/#lets-work-together, printed Feb. 22, 2016.
Gestigon, http://www.gestigon.com/consumer-electronics.html, printed Feb. 21, 2016.
Softkinetic, Depthsense Middleware, http://www.softkinetic.com/Products/DepthSenseMiddleware, printed Feb. 22, 2016.

\* cited by examiner

DYNAMIC MODE SWITCHING OF 2D/3D MULTI-MODAL CAMERA FOR EFFICIENT GESTURE DETECTION

BACKGROUND OF THE INVENTION

Field of the Invention

The present invention relates to information handling systems. More specifically, embodiments of the invention relate to gesture detection using a camera associated with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with an integrated video camera (e.g., a webcam). For example, all in one type information handling systems or portable type information handling systems may include the video camera within the housing of the system while stand alone type information handling systems may include the video camera which is associated with the display device of the information handling system. In certain systems the video camera may be integrated with the display device. In other systems, the video camera may be coupled to the information handling system and then located in proximity with the display device.

It is also known to use cameras to perform gesture detection. Known two dimensional (2D) cameras (such as webcam type cameras) can provide certain advantages over three dimensional (3d) cameras (also referred to as depth cameras). More specifically, gesture recognition systems based on 2D cameras often require fewer resources (such as processor and power resources). Additionally, gesture recognition systems based on 2D cameras can typically detect users at a greater distance than those based on 3D cameras (due to no need for an active light source). However, when performing gesture detection, the use of 2D cameras can present a few challenges also. For example, 2D cameras that are sensitive to visible light often don't function optimally in environments with low levels of ambient light. Other cameras may be sensitive to other parts of the light spectrum (e.g., infrared (IR) cameras) and can function in low light, but may be of limited usage (e.g., may not be used for web conferencing). Also, gesture recognition systems based on 2D cameras often don't function optimally in environments which have challenging backgrounds (e.g., intricate, detailed, and/or complex backgrounds). Also, gesture recognition systems based on 2D cameras often don't function optimally in scenarios that require fine hand or finger tracking (e.g., due to lack of depth information).

SUMMARY OF THE INVENTION

A system, method, and computer-readable medium are disclosed for dynamically controlling a multi-modal camera system to take advantage of the benefits of sensing gestures with a 2D camera, while overcoming the challenges associated with 2D cameras for performing gesture detection. In certain embodiments, the multi-modal camera system includes an RGB camera and a depth camera, thus providing both a 2D and a 3D capture mode. In certain embodiments, the multi-modal camera system includes an RGB CMOS camera and a time-of-flight depth camera and can function in a 2D or 3D mode.

Additionally, in certain embodiments, dynamically controlling the multi-modal camera system includes a gesture detection control module which drives the multi-modal camera system during gesture detection to balance resource utilization and detection accuracy. More specifically, in certain embodiments, the gesture detection control module includes a gesture recognizer which performs image analysis on the image streams (from the 2D and/or 3D camera modes of operation) to detect and communicate gesture events to an operating system and/or application. More specifically, in certain embodiments, the gesture detection control module includes a stream manager which controls the camera modes and passes the image streams to the gesture recognizer. In certain embodiments, the gesture detection control module includes at least one detector module where decisions regarding which camera modes to enable are made with the help of the detector module. More specifically, in certain embodiments, the detector module processes images from the stream manager and communicates results to the stream manager whether or not conditions of interest are currently detected.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
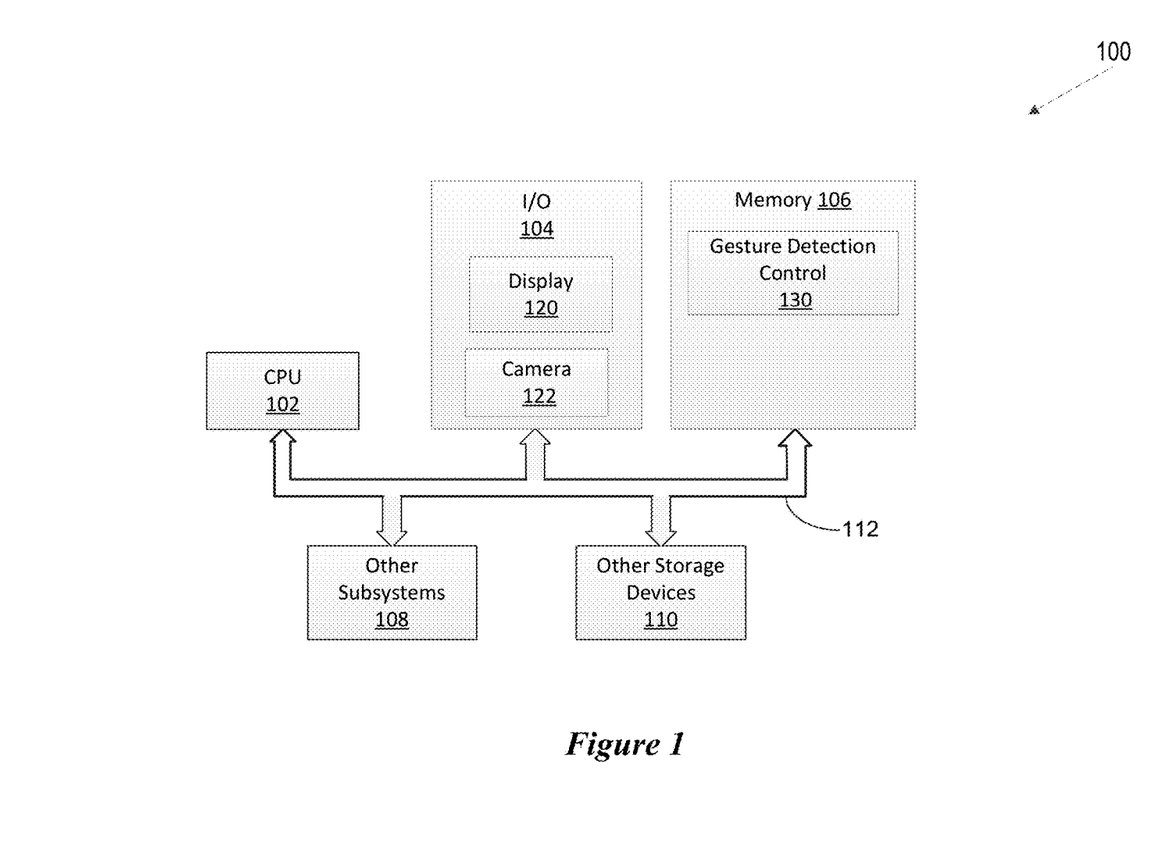
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display device 120, a camera system 122 (such as a multi-modal camera), a keyboard, a mouse, and associated controllers, memory 106, and various other subsystems 108. The information handling system 100 likewise includes other storage devices 110. The components of the information handling system are interconnected via one or more buses 112.

The information handling system also includes a gesture detection control system 130 within the memory 106 and containing instructions for execution by the processor 102. The gesture detection control system 130 dynamically controls the multi-modal camera system to take advantage of the benefits of sensing gestures with a 2D camera, while overcoming the challenges associated with the use of 2D cameras for performing gesture detection. In certain embodiments, the multi-modal camera system 122 includes an RGB camera and a depth camera, thus providing both a 2D and a 3D capture mode. In certain embodiments, the 2D camera generates a 2D image stream which includes a color value on a per pixel basis. In certain embodiments, the 3d camera generates a 3D image stream which includes a color value and a depth value on a per pixel basis. In certain embodiments, the multi-modal camera system includes an RGB CMOS camera and a time-of-flight depth camera, and can function in a 2D or 3D mode.

Figure 2:
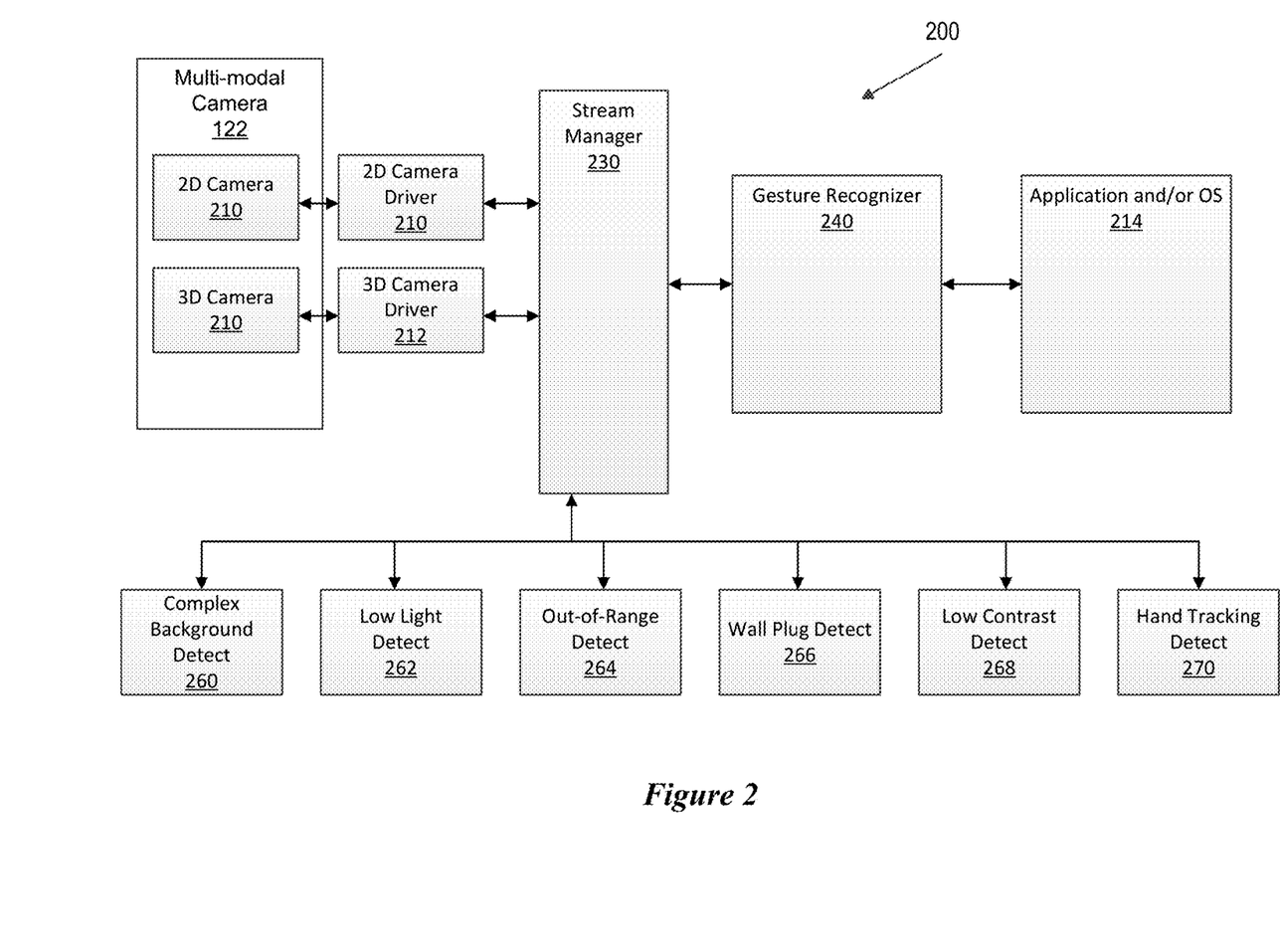
FIG. 2 shows a block diagram of a gesture detection control environment.

Referring to FIG. 2, a block diagram of a gesture detection control environment 200 is shown. The gesture detection control environment 200 includes the multi-modal camera 122, camera drivers 210, 212, gesture detection control system 130 as well as an application or operating system 214. The gesture detection control system 130 includes a stream manager 230, a gesture recognizer 240 as well as a plurality of detector modules. In various embodiments, the detectors include one or more of a complex background detector module 260, a low light detector module 262, an out-of-range detector module 264, a wall plug detector module 266, a low contrast detector module 268 and a hand tracking detector module 270.

The gesture detection control system 130 drives the multi-modal camera system 122 during gesture detection to balance resource utilization and detection accuracy. The gesture recognizer 240 performs image analysis on the image streams (from the 2D and/or 3D camera modes of operation) to detect and communicate gesture events to an operating system and/or application. The stream manager 230 controls the camera modes and passes the image streams to the gesture recognizer. The detector modules provide decisions regarding which camera modes to enable. More specifically, in certain embodiments, the detector module processes images from the stream manager and communicates results to the stream manager whether or not conditions of interest are currently detected.

Most detector modules need only the 2D image stream (and perhaps other non-image inputs) to detect their conditions. A few, however, may rely on quickly checking the 3D image stream to confirm that a condition holds or doesn't hold. For this purpose, these detector modules may request from the stream manager 230 3D images for a short period of time. When this occurs, if 3D mode isn't already active, it will be enabled and the corresponding images provided to the appropriate detector module. In this case the stream will remain active until the detector module makes a determination, and will be invoked so as to utilize the minimum resources required for analysis (e.g. by setting the stream to a low resolution and/or frame rate).

The complex background detector module 260 detects when a scene's background degrades gesture detection accuracy. The complex background detector module 260 analyzes a 2D image stream for frequent background changes and for multiple faces or bodies.

The low light detector module 262 detects when ambient light level drops below a threshold necessary for acceptable gesture detection accuracy. The low light detector module monitors an ambient light sensor and confirms a low light reading via analysis of the 2D image stream's brightness histograms. If no ambient light sensor is available, then the low light detector module monitors the image stream's brightness histogram. The out-of-range detector module 264 detects when a user is out of range of the 3D camera. The out-of-range detector 264 analyzes the 2D image stream for static scenes (indicating absence of users) and a size of detected faces (for a distance estimation). If analysis of the 2D image stream is not enough for a determination of whether a user is out of the 3D camera's range, then the out-of-range detector module 264 temporarily analyzes a 3D image stream for moving objects. The wall plug detector module 266 detects when a device is coupled to a continuous power source (i.e., is not running on battery power). When a device is coupled to a continuous power source, the gesture detection control system 130 can keep the 3D camera on continuously, providing optimal gesture tracking and avoiding any latency associated with having to turn on the 3D camera when needed. The wall plug detector module 266 monitors OS settings to detect power source changes. The low contrast detector module 268 detects when there is not enough contrast between a user and a user environment (i.e., a scene) to reliably detect gestures (e.g., due to glare from windows, flesh-tone matching clothing, etc.) The low contrast detector module analyzes the 2D image stream for object motion with detection of face, hands or other body parts. If the analysis of the 2D image stream is not enough for a contrast determination, the low contrast detector module 268 temporarily analyzes the 3D image stream for edge or boundary differences from any detected in a color image of the 2D stream. The hand tracking detector module 270 detects when a user has entered a hand-tracking mode of operation. The hand tracking detector module queries the gesture recognizer 240 to determine whether or not a hand-tracking mode of operation is active.

The stream manager 230 changes the camera modes and configures the image streams dynamically based on the detected conditions to provide the gesture recognizer 240 with data to accurately detect gestures while minimizing resource utilization. In certain embodiments, additional camera capabilities may allow for more complex operations.

For example, a stereoscopic camera implemented with two RGB+IR CMOS sensors (e.g. a Sony camera available under the trade designation IMX288) and one or more IR illumination sources may provide a 2D mode, a 2D +IR mode (for low light conditions), a 3D mode, and a 3D +IR mode.

Figure 3A:
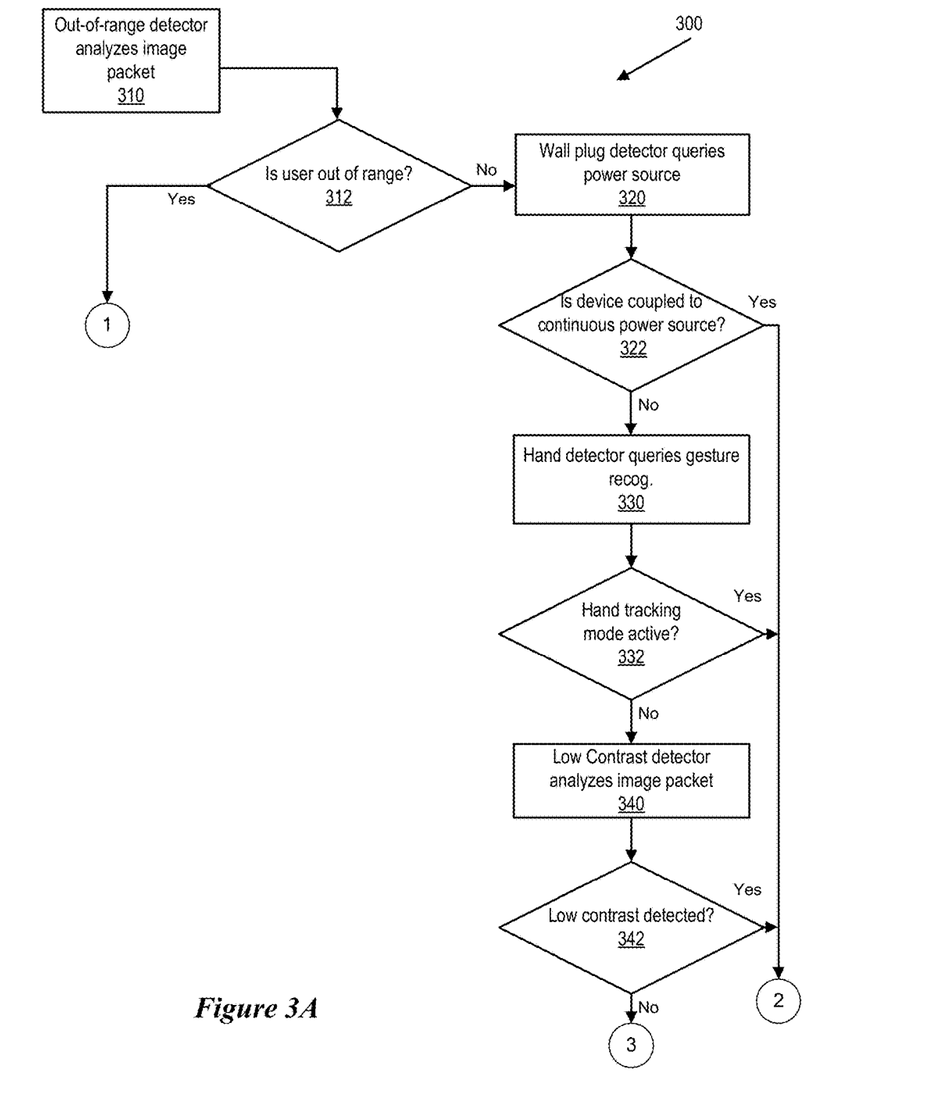
FIGS. 3A and 3B, generally referred to as FIG. 3, show a flow chart of the operation of a gesture detection control system.
Figure 3B:
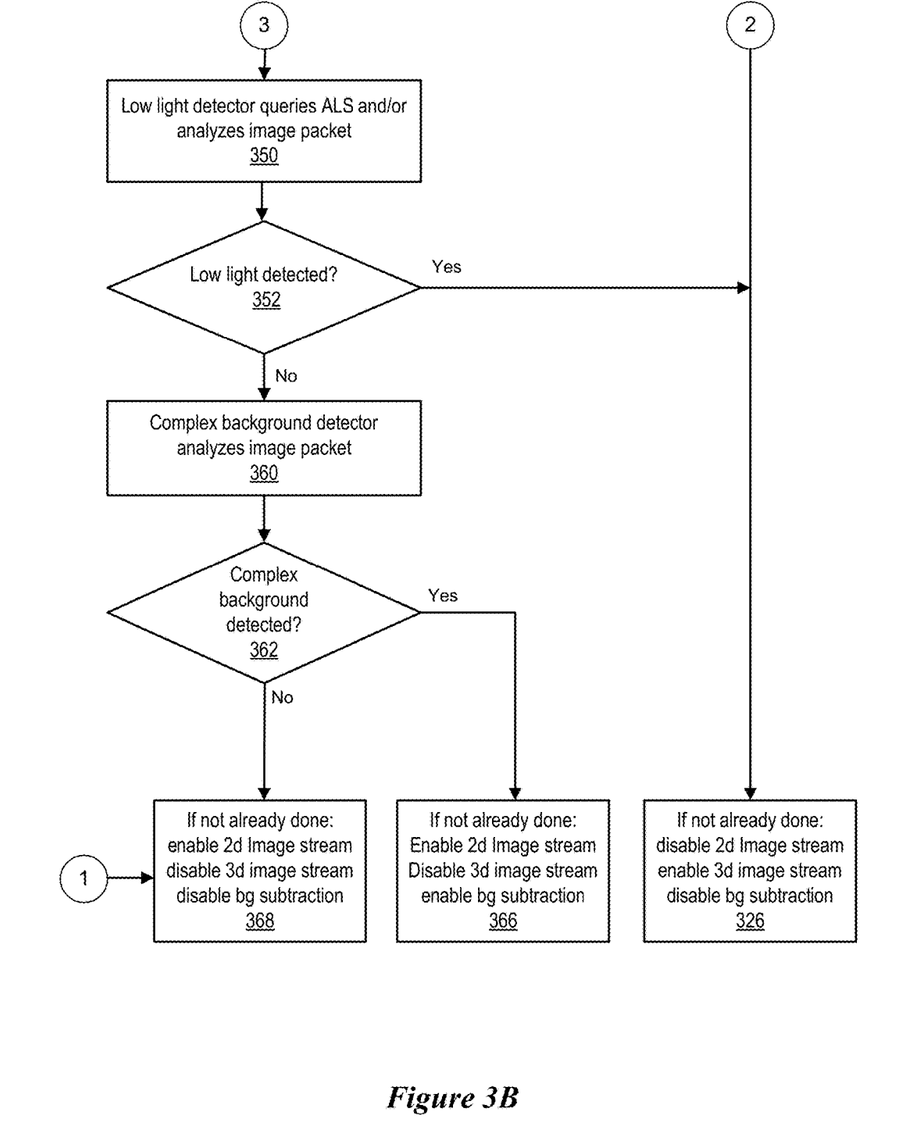

Referring to FIGS. 3A and 3B, a flow chart of the operation 300 of a gesture detection control system 130 is shown. The flow chart illustrates how the stream manager 230 changes the camera modes and configures the image streams based upon detected conditions to provide the gesture recognizer with data to accurately detect gestures while minimizing resource unitization.

The operation occurs for each video frame. When invoking each detector module, the stream manager 230 provides an image packet as an input. The image packet contains a pointer to image data in memory for each active camera image stream that has new capture data available. The duration of a video frame is determined by the highest frame rate image stream that is active. For example, if the 2D image stream is set to 30 frames per second (FPS) and the 3D image stream is set to 15 FPS, then the frame rate is 30 FPS (meaning every 33.3 milliseconds, the stream manager 230 executes the operation 300 with a new image packet). For the example frame rates, each image packet contains a new 2D image, but only every other image packet contains a new 3D image.

More specifically, the gesture detection control system 130 begins operation as step 310 with the out of range detector module 260 analyzing an image packet. Next, at step 312, the out-of-range detector module 260 determines whether a user is out of range. If the user is out of range, then at step 316 the gesture detection control system 130 enables the 2D image stream, disables the 3D images stream and disables background (bg) subtraction if the camera system is not already so configured. Background subtraction removes complex backgrounds from the 2D image stream. In certain embodiments, a background subtraction operation uses the 3D camera. However, by lowering the 3D camera resolution and/or frame rate, the present system does not incur the full penalty of running the 3D camera at full capability. Additionally, the system is conservative in segmentation so that there is enough segmentation information to remove the complex background while at the same time saving power over known (e.g., high-accuracy) background subtraction operations. This is possible because the background subtraction performed by the system does not need to be visually appealing.

If the user is within range, then at step 320 the wall plug detector module 266 queries the power sources. Next, at step 322, the wall plug detector module 266 determines whether the information handling system is coupled to a continuous power supply. If the information handling system is coupled to a continuous power supply, then at step 326 the gesture detection control system 130 disables the 2D image stream, enables the 3D images stream and disables background (bg) subtraction if the camera system is not already so configured. So doing maximizes gesture detection accuracy when the device is not running on battery and can therefor afford more power consumption.

If the information handling system is not coupled to a continuous power supply, then at step 330 the hand tracking detector module 270 queries the gesture recognizer 240. Next, at step 332, the hand tracking detector module 266 determines whether a hand tracking mode of operation is active. If the hand tracking mode of operation is active, then at step 326 the gesture detection control system 130 disables the 2D image stream, enables the 3D images stream and disables background (bg) subtraction if the camera system is not already so configured. There can be times when gesture detection may require precise hand tracking (e.g., when controlling a mouse cursor by detecting hand movement). When such precise hand tracking is required, it is desirable to perform the hand tracking using a 3D image stream (which can provide more accurate hand tracking) rather than with a 2D image stream.

If the hand tracking mode of operation is not active, then at step 340 the low contrast detector module 282 analyzes the image packet. Next, at step 342, the low contrast detector module 268 determines whether low contrast is detected. If low contrast is detected, then at step 326 the gesture detection control system 130 disables the 2D image stream, enables the 3D image stream and disables background (bg) subtraction if the camera system is not already so configured.

If low contrast is not detected, then at step 350 the low light detector module 262 queries the ambient light sensor (ALS) and/or analyzes the image packet. Next, at step 352, the low light detector module 262 determines whether a low light condition is detected. If a low light condition is detected, then at step 326 the gesture detection control system 130 disables the 2D image stream, enables the 3D images stream and disables background (bg) subtraction if the camera system is not already so configured.

If a low light condition is not detected, then at step 360 the complex background detector module 260 analyzes the image packet. Next, at step 362, the complex background detector module 260 determines whether a complex background is detected. If a complex background is detected, then at step 366 the gesture detection control system 130 enables the 2D image stream, disables the 3D images stream and enables background (bg) subtraction if the camera system is not already so configured. If a complex background is not detected, then at step 368 the gesture detection control system 130 enables the 2D image stream, disables the 3D images stream and disables background (bg) subtraction if the camera system is not already so configured.

When background subtraction is enabled, the stream manager 230 masks out the background pixels for each image in the 2D image stream before providing the image stream to the gesture recognizer 240. The stream manager 230 determines which pixels to mask out by inspecting each matching 3D image for pixels that exceed a minimum distance (which minimum distance may be preset or use-case dependent) from the camera. For example, if only hands are being tracked, the stream manager 230 can more aggressively remove background by setting the minimum distance close to the camera (i.e. to remove all of the user's body from the image other than the hand). As another example, if it is desirable to track the hands and face, then the minimum distance can be set farther from the camera, or face-detect information (e.g. bounding box location and characteristics) can be retained even if the face pixels are masked out.

In certain embodiments, power consumption is minimized when background subtraction is enabled (otherwise there would be little benefit from using 2D gesture detection in favor of 3D gesture detection). Therefore, during background subtraction, the stream manager 230 configures the 3D image stream for a lower xy resolution, z resolution, and/or frame rate than would be used for 3D gesture detection. This means that background pixel determination is conservative (to account for the lower resolution/accuracy depth map). For example, a pre-determined number of pixels around the foreground/background boundary can be retained to avoid accidentally removing actual foreground pixels.

While each image packet is individually processed, detecting changes in conditions may not be possible until multiple packets are analyzed. Thus, in certain embodiments, intermediate analysis results may be stored to aid in gesture determination using future image packets.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example in certain embodiments the image stream itself may be manipulated before arriving at the gesture recognizer. Such manipulation may improve the overall accuracy of the gesture recognition operation.

Consequently, the invention is intended to be limited only by the spirit and scope of the appended claims, giving full cognizance to equivalents in all respects.

What is claimed is:

1. A computer-implementable method for dynamically controlling a multi-modal camera system, comprising:
   receiving a plurality of image streams from the multi-modal camera system;
   performing an image analysis on the plurality of image streams provided by the multi-modal camera; and,
   balancing resource utilization and gesture detection accuracy based upon the image analysis, the balancing resource utilization and gesture detection accuracy dynamically changing camera modes of the multi-modal camera and configuring the plurality of image streams to provide a gesture recognizer with data to accurately detect gestures while minimizing resource utilization of an information handling system, the information handling system comprising power resources and the minimizing resource utilization comprising minimizing power consumption; and,
   detecting conditions of the image streams and configuring modes of operation of the multi-modal camera based upon the conditions; and wherein
   the conditions comprise a complex background condition, a low light condition, an out-of-range condition, a power condition, a low contrast condition and a hand tracking condition.

2. The method of claim 1, wherein:
   the multi-modal camera system comprises a two dimensional camera and a three dimensional camera; and, the two dimensional camera provides a two dimensional image stream and the three dimensional camera provides a three dimensional image stream.

3. The method of claim 2, wherein:
the two dimensional camera comprises an RGB camera and the three dimensional camera comprises a depth camera.

4. The method of claim 1, wherein:
the image analysis comprises at least one of detecting gesture events and detecting conditions for which a change in camera mode is desirable.

5. A system comprising:
a processor;
a data bus coupled to the processor;
a multi-modal camera system; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
receiving a plurality of image streams from the multi-modal camera system;
performing an image analysis on the plurality of image streams provided by the multi-modal camera system; and,
balancing resource utilization and gesture detection accuracy based upon the image analysis, the balancing resource utilization and gesture detection accuracy dynamically changing camera modes of the multi-modal camera and configuring the plurality of image streams to provide a gesture recognizer with data to accurately detect gestures while minimizing resource utilization of an information handling system, the information handling system comprising power resources and the minimizing resource utilization comprising minimizing power consumption; and,
detecting conditions of the image streams and configuring modes of operation of the multi-modal camera based upon the conditions; and wherein
the conditions comprise a complex background condition, a low light condition, an out-of-range condition, a power condition, a low contrast condition and a hand tracking condition.

6. The system of claim 5, wherein:
the multi-modal camera system comprises a two dimensional camera and a three dimensional camera; and,
the two dimensional camera provides a two dimensional image stream and the three dimensional camera provides a three dimensional image stream.

7. The system of claim 6, wherein:
the two dimensional camera comprises an RGB camera and the three dimensional camera comprises a depth camera.

8. The system of claim 5, wherein:
the image analysis comprises at least one of detecting gesture events and detecting conditions for which a change in camera mode is desirable.

9. A non-transitory, computer-readable storage medium embodying computer program code, the computer program code comprising computer executable instructions configured for:
receiving a plurality of image streams from a multi-modal camera system;
performing an image analysis on the plurality of image streams provided by the multi-modal camera system; and,
balancing resource utilization and gesture detection accuracy based upon the image analysis, the balancing resource utilization and gesture detection accuracy dynamically changing camera modes of the multi-modal camera and configuring the plurality of image streams to provide a gesture recognizer with data to accurately detect gestures while minimizing resource utilization of an information handling system, the information handling system comprising power resources and the minimizing resource utilization comprising minimizing power consumption; and,
detecting conditions of the image streams and configuring modes of operation of the multi-modal camera based upon the conditions; and wherein
the conditions comprise a complex background condition, a low light condition, an out-of-range condition, a power condition, a low contrast condition and a hand tracking condition.

10. The non-transitory, computer-readable storage medium of claim 9, wherein:
the multi-modal camera system comprises a two dimensional camera and a three dimensional camera; and,
the two dimensional camera provides a two dimensional image stream and the three dimensional camera provides a three dimensional image stream.

11. The non-transitory, computer-readable storage medium of claim 10, wherein:
the two dimensional camera comprises an RGB camera and the three dimensional camera comprises a depth camera.

12. The non-transitory, computer-readable storage medium of claim 9, wherein:
the image analysis comprises at least one of detecting gesture events and detecting conditions for which a change in camera mode is desirable.

* * * * *